(12) United States Patent
Terashima

(10) Patent No.: US 8,855,173 B2
(45) Date of Patent: *Oct. 7, 2014

(54) METHOD OF CAPTURING SATELLITE SIGNAL AND DEVICE FOR CAPTURING SATELLITE SIGNAL

(71) Applicant: Seiko Epson Corporation, Tokyo (JP)

(72) Inventor: Maho Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,856

(22) Filed: Jan. 9, 2013

(65) Prior Publication Data

US 2013/0177046 A1    Jul. 11, 2013

(30) Foreign Application Priority Data

Jan. 11, 2012  (JP) .................................. 2012-002804

(51) Int. Cl.
*H04B 1/709* (2011.01)
*G01S 19/30* (2010.01)

(52) U.S. Cl.
CPC ................ *H04B 1/709* (2013.01); *G01S 19/30* (2013.01)

USPC .......................................................... 375/150

(58) Field of Classification Search
CPC ...................................................... H04B 1/709
USPC .......................................................... 375/150
See application file for complete search history.

(56) References Cited

U.S. PATENT DOCUMENTS

| | | | |
|---|---|---|---|
| 3,701,894 A | 10/1972 | Low et al. | |
| 6,377,683 B1 * | 4/2002 | Dobson et al. | 379/406.12 |
| 6,888,879 B1 | 5/2005 | Lennen | |
| 7,110,442 B2 | 9/2006 | Lennen | |
| 2006/0056497 A1 | 3/2006 | Lennen | |
| 2010/0254492 A1 | 10/2010 | Chen | |

* cited by examiner

*Primary Examiner* — Michael Neff
(74) *Attorney, Agent, or Firm* — Kilpatrick Townsend & Stockton LLP

(57) ABSTRACT

A method of acquiring a satellite signal includes calculating a correlation result of a reception signal from a GPS satellite and a replica code using an output value of one adder-subtractor for a combination of addition and subtraction corresponding to time-series change in code values of the replica code from among a plurality of adder-subtractors for addition-subtraction of sampling values obtained by sampling the reception signal in a time series with different combinations of addition and subtraction, and acquiring the satellite signal of the GPS satellite using the correlation result.

6 Claims, 12 Drawing Sheets

FIG. 2

METHOD OF CAPTURING SATELLITE SIGNAL AND DEVICE FOR CAPTURING SATELLITE SIGNAL This application claims priority to Japanese Patent Application No. 2012-002804, filed Jan. 11, 2012, the entirety of which is hereby incorporated by reference.

BACKGROUND

1. Technical Field

The present invention relates to a method of capturing a satellite signal, or the like.

2. Related Art

As a positioning system using satellite signals, a GPS (Global Positioning System) is widely known, and is used for a position calculation device which is embedded in a mobile phone, a car navigation device, or the like. In the GPS, position calculation is performed to obtain the position coordinates and timepiece errors of the position calculation device on the basis of information regarding the positions of a plurality of GPS satellites or the pseudo distance from each GPS satellite to the position calculation device.

GPS satellite signals sent from the GPS satellites are modulated with spread codes which are called C/A (Coarse and Acquisition) codes and different between the GPS satellites. In order to capture the weak GPS satellite signals, the position calculation device performs correlation computation between the received signal (reception signal) of the C/A code and the signal (replica code) of a replica code simulating the C/A code to capture the GPS satellite signals.

Specifically, the correlation computation is performed while shifting the phase of the replica code, the phase at which the highest correlation value is obtained becomes a so-called code phase, and the GPS satellite signals are captured. For example, U.S. Unexamined Patent Application Publication No. 2006/0056497 discloses a technique for accelerating the acquisition of the GPS satellite signals in a weak electric field environment or the like.

However, in the correlation computation of the related art, processing for multiplying and integrating each of the sampling value of the reception signal and the sampling value of the replica code should be performed for the number of phase shifts. For this reason, the circuit scale inevitably increases. This problem causes an increase in power consumption.

SUMMARY

An advantage of some aspects of the invention is that it provides a method of realizing correlation computation between a reception signal and a replica code with a small amount of computation.

A first aspect of the invention is directed to a method of acquiring a satellite signal including calculating a correlation result of a reception signal from a satellite and a replica code using an output value of one adder-subtractor for a combination of addition and subtraction corresponding to time-series change in code values of the replica code from among a plurality of adder-subtractors for addition-subtraction of sampling values obtained by sampling the reception signal in a time series with different combinations of addition and subtraction, and acquiring the satellite signal of the satellite using the correlation result.

The first aspect of the invention may be configured, as a third aspect of the invention, as a device for acquiring a satellite signal including a plurality of adder-subtractors which add and subtract sampling values obtained by sampling a reception signal from a satellite in a time series with different combinations of addition and subtraction, a correlation value calculation unit which calculates a correlation value of the reception signal and a replica code using an output value of one adder-subtractor for a combination of addition and subtraction corresponding to time-series change in code values of the replica codes from among the plurality of adder-subtractors, and an acquiring unit which acquires the satellite signal of the satellite using the correlation result.

According to the first aspect and the like of the invention, the correlation result of the reception signal and the replica code is calculated using the output value of one adder-subtractor for a combination of addition and subtraction corresponding to time-series change in the code values of the replica code from among a plurality of adder-subtractors for addition-subtraction of the sampling values obtained by sampling the reception signal from the satellite in a time series with different combinations of addition and subtraction. The satellite signal of the satellite is captured using the calculated correlation result.

Accordingly, the correlation result of the reception signal and the replica code can be calculated without multiplying the sampling values of the reception signal and the code values of the replica code. When a calculator is constituted by a circuit, a circuit for multiplication requires a larger number of circuit elements than a circuit for addition and subtraction. When calculation is performed by a program, the number of steps of multiplication requires an enormously larger number of steps than the number of steps of addition-subtraction. For this reason, the effect that multiplication is not required is very large. Therefore, power consumption is of course reduced.

A second aspect of the invention is directed to the method of acquiring a satellite signal of the first aspect of the invention, wherein the plurality of adder-subtractors include circuits which perform addition-subtraction with different combinations of addition and subtraction when the addition-subtraction sign of one sampling value of k (k≥2) sampling values is assumed as a predetermined sign, and the calculating of the correlation result may include selecting the one adder-subtractor based on a combination of code values other than one code value corresponding to the one sampling value from among k code values, and changing a sign of the output value of the one adder-subtractor based on the one code value.

As a fourth aspect of the invention, the device for acquiring a satellite signal according to the third aspect of the invention may be configured such that the plurality of adder-subtractors include circuits which perform addition-subtraction with different combinations of addition and subtraction when the addition-subtraction sign of one sampling value of k (k≥2) sampling values is assumed as a predetermined sign, and the correlation value calculation unit may select the one adder-subtractor based on a combination of code values other than one code value corresponding to the one sampling value from among k code values, and may calculate the correlation result using a value obtained by changing a sign of the output value of the one adder-subtractor based on the one code value.

According to the second aspect and the like of the invention, the plurality of adder-subtractors include circuits which perform addition-subtraction with different combinations of addition and subtraction when the addition-subtraction sign of one sampling value from among the k (k≥2) sampling values is assumed as a predetermined sign. Accordingly, the circuit configuration can be simplified compared to a configuration in which circuits perform addition-subtraction of the k sampling values with different combinations of addition and subtraction. At this time, one adder-subtractor is selected based on a combination of code values other than one code value corresponding to one sampling value from among the k code values. The correlation result can be easily calculated using the value obtained by changing the sign of the output value of one adder-subtractor based on one code value.

As a fifth aspect of the invention, the device for acquiring a satellite signal according to the fourth aspect of the invention may be configured such that k is equal to or greater than 4, the device further includes an addition-subtraction unit which performs addition-subtraction by changing the combinations of addition and subtraction of sampling values in each of two groups of the k sampling values, and a storage unit which stores the addition-subtraction result of the addition-subtraction unit, wherein the plurality of adder-subtractors computes the addition-subtraction results in the groups stored in the storage unit by changing the combinations of addition and subtraction between the groups.

According to the fifth aspect of the invention, the addition-subtraction unit performs addition-subtraction by changing the combinations of addition and subtraction of the sampling values in each of the two groups of the k sampling values. The storage unit stores the addition-subtraction result of the addition-subtraction unit. A plurality of adder-subtractors compute the addition-subtraction results in the groups stored in the storage unit by changing the combinations of addition and subtraction between the groups. Therefore, the same result as when performing addition-subtraction by changing the combinations of addition and subtraction of the k sampling values can be obtained.

As a sixth aspect of the invention, the device for acquiring a satellite signal according to any of the third to fifth aspects of the invention may be configured such that the reception signal includes a signal BPSK (Binary Phase Shift Keying) modulated at N [Hz], the sampling frequency is M (>2N) [Hz], and the plurality of adder -subtractors include circuits which perform addition-subtraction of a combination of addition-subtraction signs corresponding to possible time-series change in code values when sampling the replica code at M [Hz].

According to the sixth aspect of the invention, the reception signal include a signal BPSK modulated at N [Hz], and the sampling frequency is M (>2N) [Hz]. A plurality of adder-subtractors include circuits which perform addition-subtraction of a combination of addition and subtraction corresponding to possible time-series change in the code values when the replica code is sampled at M [Hz]. Therefore, the circuit scale can be reduced compared to a configuration in which circuits add and subtract a combination of addition and subtraction codes corresponding to time-series change in all of the code values.

BRIEF DESCRIPTION OF THE DRAWINGS

The invention will be described with reference to the accompanying drawings, wherein like numbers reference like elements.

FIG. 2 is an explanatory view of a method of calculating a correlation value in a principle description.

DESCRIPTION OF EXEMPLARY EMBODIMENTS

1. Principle

A satellite signal capturing method in this embodiment will be described.

In a position calculation system using GPS satellites, a GPS satellite as a type of positioning satellite sends navigation message data including satellite orbit data, such as almanac or ephemeris, along with a GPS satellite signal as a type of positioning satellite signal.

The GPS satellite signal spectrum spreads by a CDMA (Code Division Multiple Access) system using a C/A (Coarse and Acquisition) code as a type of spread code, and navigation message data is carried by BPSK (Binary Phase Shift Keying) modulating the C/A code in terms of 20 PN frames. The C/A code is a pseudo random noise code in a repetition period of 1 ms with a code length 1023 chip as 1 PN frame and differs between the satellites.

While the frequency when the GPS satellite sends the GPS satellite signal (specified carrier frequency) is specified as 1.57542 [GHz] in advance, the frequency at which the GPS reception device receives the GPS satellite signal does not necessarily coincide with the specified carrier frequency due to Doppler effect caused by the movement of the GPS satellite or the GPS reception device. For this reason, in order to capture the GPS satellite signal from the received electric wave, so-called frequency search is performed. In order to specify the phase of the received GPS satellite signal (C/A code), that is, a code phase, so-called phase search is performed.

With two types of search, the GPS satellite signal is captured. However, if the frequency is known, only phase search may be performed to capture the GPS satellite signal. This embodiment has a feature about correlation computation which is performed in frequency search and phase search, that is, a method of calculating a correlation value.

Figure 1:
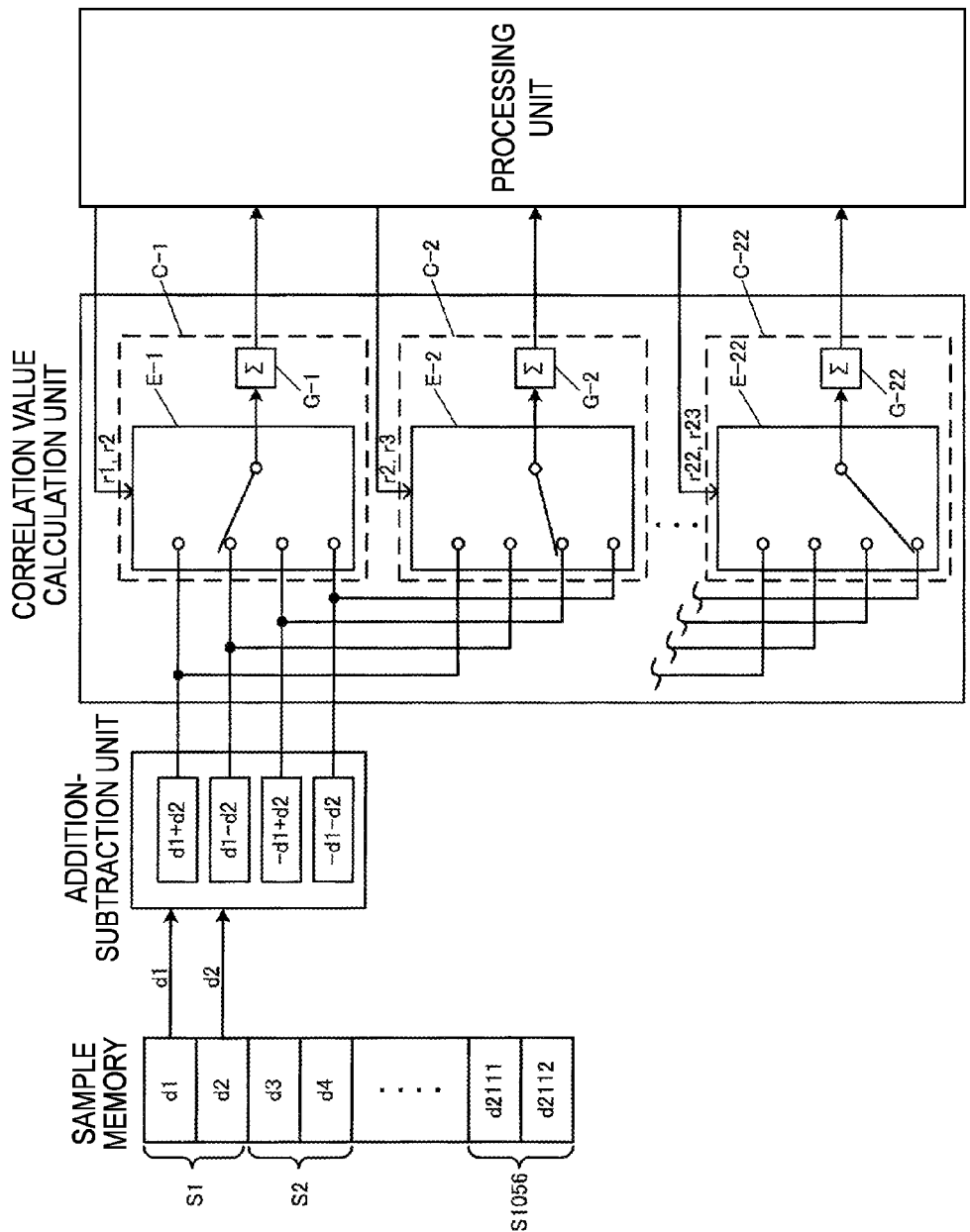
FIG. 1 is an explanatory view of a method of calculating a correlation value in a principle description.

FIG. 1 is an explanatory view of a method of calculating a correlation value in this embodiment. In FIG. 1, a sample memory stores values (hereinafter, referred to as "sampling values") obtained by sampling the reception signals for 1 millisecond. In this embodiment, sampling is done 2112 times for 1 millisecond. For this reason, the sample memory stores 2112 sampling values of "d1" to "d2112" as the sampling values for 1 millisecond. The carrier of the GPS satellite signal may be removed before sampling the reception signals or after sampling.

The C/A code is a code length 1023 chip and is sampled 2112 times to obtain the 2112 sampling values of "d1" to "d2112". The chip rate of the C/A code is 1.023 [MHz], and the C/A code is sampled with a frequency higher than two times the chip rate. This corresponds to a case where a reception signal of a signal BPSK modulated at N [Hz] is sampled with the sampling frequency as M (>2N) [Hz].

Next, a processing unit selects k sampling values which are output to an addition-subtraction unit. That is, the processing unit is also called a selection control unit which performs control to select every k sampling values in a time series obtained by sampling the reception signals. In this embodiment, it is assumed that the value of k is equal to or greater than 2 (k≥2).

While the value of k can be appropriately selected, as the description of the principle, the simplest example where "k=2" will be described. In this case, since every two sampling values of the sampling values "d1" to "d2112" of the reception signals are selected, 1056 sets of reception data are obtained, and are referred to as "S1" to "S1056" with symbol "S".

If each of the reception data sets "S1" to "S1056" is selected and output to the addition-subtraction unit, the addition-subtraction unit performs addition-subtraction of two sampling values included in the reception data set while changing the combinations of addition and subtraction. In other words, the addition-subtraction unit adds k sampling values included in the reception data set while varying the combination of negative and positive signs for each reception data set. The addition-subtraction unit has a plurality of adder-subtractors, and in the example of FIG. 1, has four adder-subtractors which perform addition-subtraction in four ways. Although in this embodiment, the description has been provided using "adder-subtractors", a circuit may be of course constituted using an "adder" as an actual circuit element.

For example, description will be provided focusing on the reception data set "S1" shown in FIG. 1. The four adder-subtractors provided in the addition-subtraction unit perform addition-subtraction of the sampling values "d1" and "d2" included in the reception data set "S1" while changing the combinations of addition and subtraction. As a result, four addition-subtraction results of "d1+d2", "d1−d2", "−d1+d2", and "−d1−d2" are obtained. The addition-subtraction is performed for all of the reception data sets "S1" to "S1056".

The addition-subtraction results are output to a correlation value calculation unit. The correlation value calculation unit is a circuit unit which calculates the correlation values of the reception signals and the replica codes. It may be said that the correlation values calculated by the correlation value calculation unit are the correlation values which correspond to the values obtained by correlation computation between the reception signals and the replica codes. The correlation value calculation unit includes a plurality of sets of a selection and totaling unit C having a selection unit E and a totaling unit G. Although the number of selection and totaling units C provided in the correlation value calculation unit is a design item, in this embodiment, an example where 22 selection and totaling units C-1 to C-22 are provided will be described.

The addition-subtraction results in four ways by the addition-subtraction unit are input in parallel to a first selection unit E-1 to a 22nd selection unit E-22 provided in the first selection and totaling unit C-1 to the 22nd selection and totaling unit C-22. That is, the addition-subtraction results in four ways of "d1+d2", "d1−d2", "−d1+d2", and "−d1−d2" are input in parallel to the first selection unit E-1 to the 22nd selection unit E-22. The selection units E are selectors which alternatively select the addition-subtraction results output from the addition-subtraction unit.

The replica codes are sampled at the same sampling time interval as the reception signal for the sake of correlation computation. In this embodiment, the replica codes which become the code length 1023 chip are sampled 2112 times. The values (hereinafter, referred to as "code values") of the sampled replica codes are referred to as "r1" to "r2112" with symbol "r".

Every k values of the 2112 code values are selected by the processing unit in the same manner as the reception signals. Here, since a case where "k=2" is considered, 1056 replica data sets are obtained. The replica data sets are referred to as "R1" to "R1056" with symbol "R".

In this embodiment, the correlation values of the reception signals and the replica codes are calculated using the output value of one adder-subtractor for a combination of addition and subtraction corresponding to time-series change in the code values of the replica codes from among a plurality of adder-subtractors for addition-subtraction of the sampling values obtained by sampling the reception signals from the GPS satellites in a time series with different combinations of addition and subtraction.

This step will be described in detail. The reception data sets and the replica data sets having the same numbers are associated with each other. In regard to a certain reception data set, a code pattern which has a combination of k code values included in a replica data set associated with the reception data set is input to the first selection unit E-1. In the following description, a combination of k code values input to each selection unit E is called a "code pattern".

A code pattern which has k code values shifted by one code value with respect to the code pattern input to the first selection unit E-1 is input to the second selection unit E-2. Similarly, a code pattern which has k code values shifted by one code value with respect to the code pattern input to the second selection unit E-2 is input to the third selection unit E-3. That is, a code pattern which has k code values shifted by n−1 code values with respect to a code pattern input to the first selection unit E-1 is input to the n-th selection unit E-n.

A case where "k=2" will be specifically described. Initially, a case where the reception data set "S1=(d1,d2)" will be processed is considered. A replica data set corresponding to the reception data set "S1" becomes the replica data set "R1= (r1,r2)". In this case, a code pattern {r1,r2} which has two code values included in the replica data set "R1" is input to the first selection unit E-1. A code pattern {r2,r3} shifted by one code value with respect to the code pattern {r1,r2} is input to the second selection unit E-2. Similarly, a code pattern {r22, r23} shifted by 21 code values with respect to the code pattern {r1,r2} is input to the 22nd selection unit E-22.

At this time, each selection unit E selects the addition-subtraction result (adder-subtractor) with a combination of positive and negative signs of the code values included in a code pattern input from the processing unit from among the four addition-subtraction results concerning the reception data set "S1" input from the addition-subtraction unit. For example, it is assumed that the code pattern input to the first selection unit E-1 is {r1=+1,r2=−1}={+,−}. At this time, the first selection unit E-1 selects the addition-subtraction result "d1−d2" with a combination of positive and negative signs of {+,−} from among the four addition-subtraction results of "d1+d2", "d1−d2", "−d1+d2", and "−d1−d2" concerning the reception data set "S1". "d1−d2" is output to the first totaling unit G-1.

Similarly, for example, it is assumed that the code pattern input to the second selection unit E-2 is {r2=−1,r3=−1}=

{−,−}. In this case, the second selection unit E-2 selects the addition-subtraction result "−d1−d2" with a combination of positive and negative signs of {−,−} from among the four addition-subtraction results of "d1+d2", "d1−d2", "−d1+d2", and "−d1−d2" concerning the reception data set "S1". "−d1−d2" is output to the second totaling unit G-2.

The addition-subtraction result selected by the selection unit E becomes the calculation result of the correlation of two sampling values included in the reception data set "S1=(d1, d2)" and two code values included in the code pattern input to the selection unit E. Specifically, the addition-subtraction result selected by the n-th selection unit E-n becomes the calculation result of "d1×rn+d2×r(n+1)".

For example, the addition-subtraction result selected by the first selection unit E-1 becomes the calculation result of "d1×rn+d2×r2", and the addition-subtraction result selected by the second selection unit E-2 becomes the calculation result of "d1×r2+d2×r3". That is, the calculation result of the correlation of k sampling values included in a reception data set and k code values included in a code pattern input to each selection unit E can be obtained without multiplication. This is one of the features of this embodiment.

Hereinafter, the addition-subtraction result selected by the selection unit E, the addition-subtraction result having a value corresponding to the calculation result of the correlation of one reception data set and one replica data set is called a "product value".

Although the description has been heretofore provided focusing on the reception data set "S1", the calculation (determination) of the product value by a sequence of steps is performed for all of the reception data sets "S1" to "S1056".

For example, when focusing on the reception data set "S2=(d3,d4)", the replica data set corresponding to the reception data set "S2" becomes the replica data set "R2=(r3,r4)". In this case, a code pattern {r3,r4} which has two code values included in the replica data set "R2" is input to the first selection unit E-1. A code pattern {r4,r5} which is shifted by one code value with respect to the code pattern {r3,r4} is input to the second selection unit E-2. Similarly, a code pattern {r24,r25} which is shifted by 21 code values with respect to the code pattern {r3,r4} is input to the 22nd selection unit E-22.

Each selection unit E selects the addition-subtraction result (adder-subtractor) with a combination of positive and negative signs of the code values included in the code pattern input from the processing unit from among the four addition-subtraction results concerning the reception data set "S2" input from the addition-subtraction unit. The selection unit E outputs the selected addition-subtraction result to the totaling unit G as the product value.

The totaling unit G totals the product values concerning the reception data sets "S1" to "S1056" input from the selection unit E to the previous value, thereby calculating the correlation value of the reception signals and the replica codes for one C/A code period. The correlation values calculated in this way correspond to the values of correlation computation between the reception signals and the replica codes.

The totaling of the product values is performed only by addition. Accordingly, in the circuit configuration of this embodiment, the correlation values can be calculated without multiplication. This has a functional effect of reducing the circuit scale of an electronic circuit.

In regard to the correlation computation in the GPS, the correlation computation between a reception signal and a replica code is executed while shifting the phase of the replica code. A replica data set corresponding to a reception data set changes depending on the shift amount of the phase to calculate a correlation value. The shift amount is referred to as a "replica offset".

For example, it is considered that, the replica offset is "j", when "j=1", the shift amount is zero, and when "j=2", the phase for one sampling position is shifted. At this time, for each of the reception data sets "S1" to "S1056", a code pattern which has k code values with the replica offset of "j=n" is input to the n-th selection unit E-n. Accordingly, each selection unit E computes the product value of the sampling value of the reception signal and the code value of the replica code while shifting the phase of the replica code.

In this embodiment, 22 selection and totaling units C are provided. For this reason, the correlation values concerning 22 replica offsets can be obtained by single computation. Meanwhile, if the phase for one C/A code period is shifted, it is necessary to calculate the correlation values concerning 2112 replica offsets. Accordingly, the computation of "W=2112/22=96 times" is performed using the 22 selection and totaling units C-1 to C-22, thereby calculating the correlation values concerning the replica offsets "1" to "2112".

Figure 2:
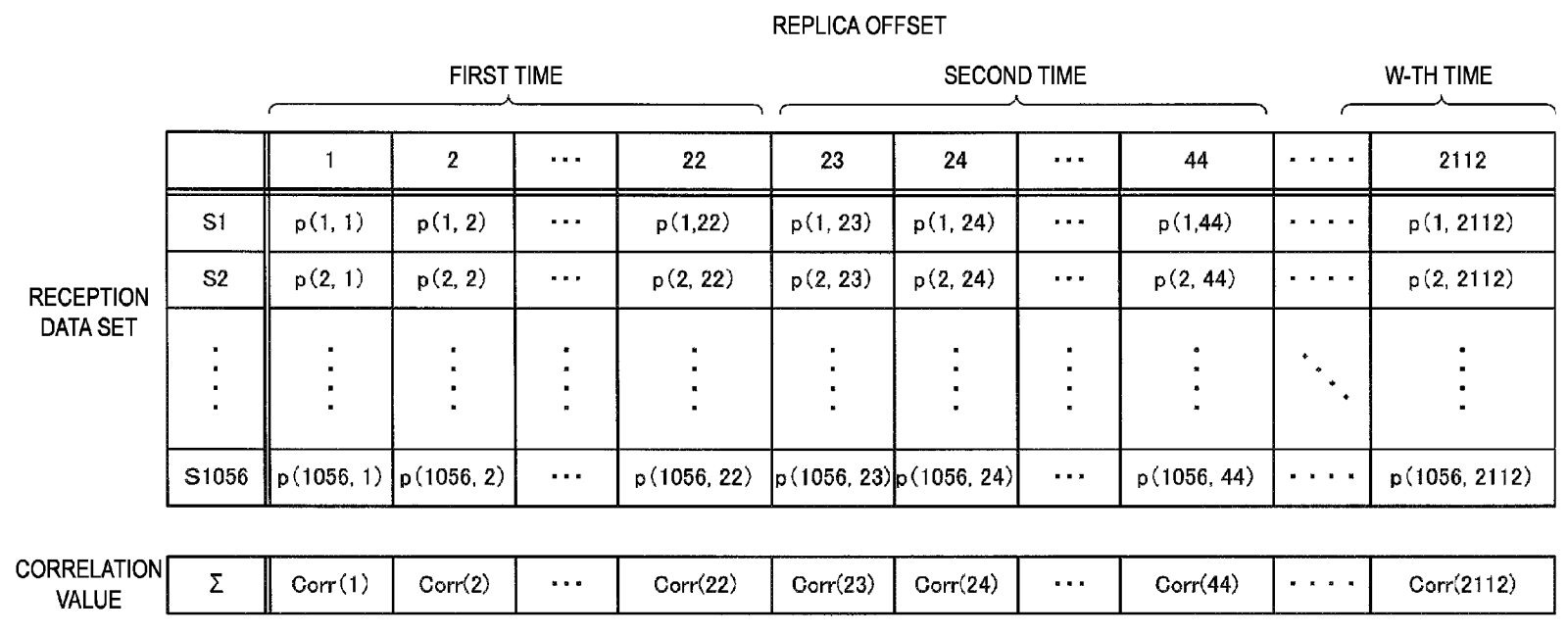

FIG. 2 is a diagram showing a product value and a correlation value obtained while shifting the phase for one C/A code period in a table format. For the m-th (m=1 to 1056) reception data set "Sm", a product value obtained when the replica offset is set to "n" (n=1 to 2112) is represented by "p(m,n)". For example, when the replica offset is set to "1", the product values obtained for the reception data sets "S1" to "S1056" are represented by "p(1,1)" to "p(1056,1)". Similarly, when the replica offset is set to "2", the product values obtained for the reception data sets "S1" to "S1056" are represented by "p(1,2)" to "p(1056,2)".

For each replica offset, the product values concerning the reception data sets "S1" to "S1056" are totaled by the totaling unit G, thereby calculating a correlation value "Corr". Specifically, in the w-th computation, the n-th totaling unit G-n totals the product values "p(1,n+22×(w−1))" to "p(1056,n+22×(w−1))" concerning the reception data sets "S1" to "S1056", thereby calculating a correlation value "Corr(n+22×(w−1))" concerning a replica offset "n+22×(w−1)".

For example, in the first computation, the n-th totaling unit G-n totals the product values "p(1,n)" to "p(1056,n)" concerning the reception data sets "S1" to "S1056", thereby calculating a correlation value "Corr(n)" concerning a replica offset "n". Similarly, in the second computation, the n-th totaling unit G-n totals the product values "p(1,n+22)" to "p(1056,n+22)" concerning the reception data sets "S1" to "S1056", thereby calculating a correlation value "Corr(n+22)" concerning a replica offset "n+22".

The correlation value calculation unit calculates the correlation values in the above-described manner, thereby finally calculating each value of the table shown in FIG. 2. The processing unit determines the code phase on the basis of the replica offset corresponding to the maximum correlation value from among the correlation values calculated by the correlation value calculation unit. This corresponds to the determination of the code phase on the basis of the correlation calculation position corresponding to the maximum correlation value from among a plurality of correlation values calculated while changing the correlation calculation position (replica offset).

2. Examples

Next, examples of a satellite signal capturing device which captures a satellite signal using the above-described satellite signal capturing method will be described. As an example of an electronic apparatus including a satellite signal capturing device, an example of a mobile phone will be described. Of course, examples to which the invention can be applied are not limited to the following examples.

2-1. First Example 2-1-1. Configuration of Mobile Phone

Figure 3:
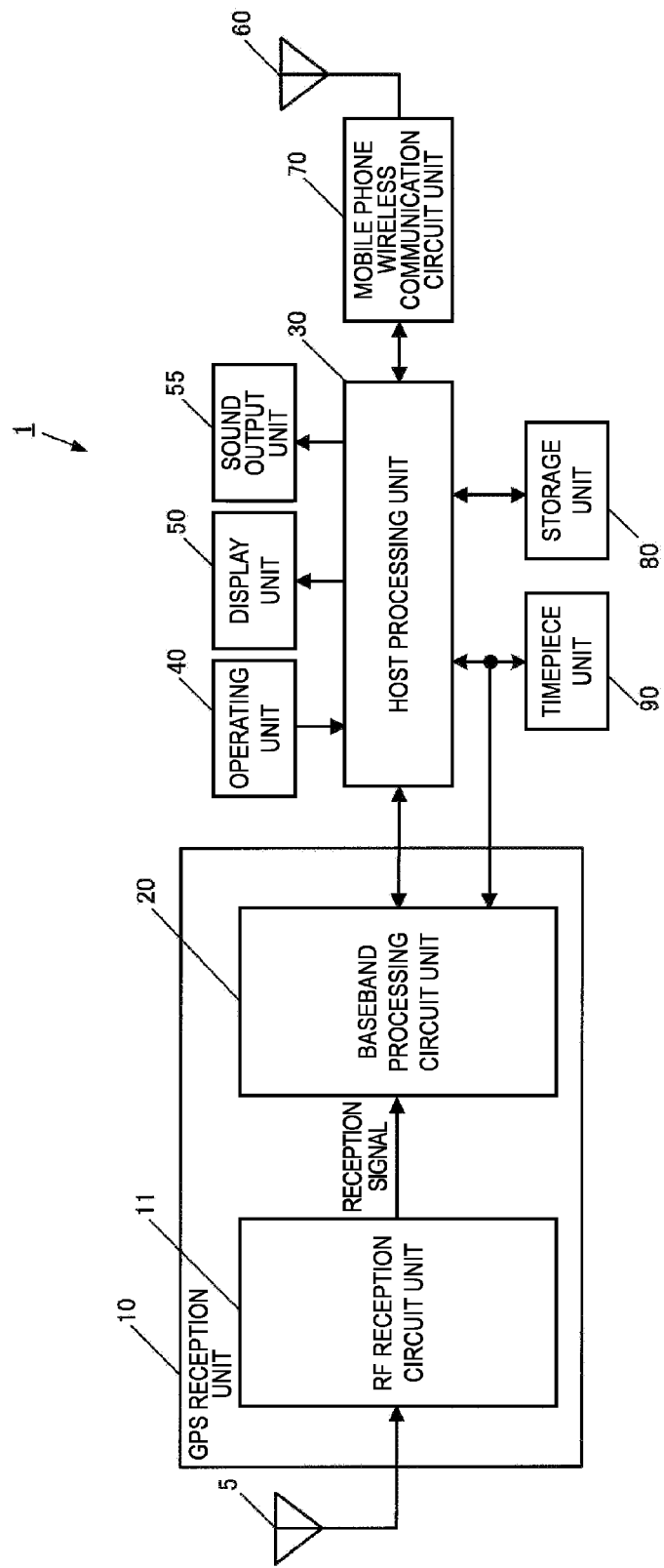
FIG. 3 is a block diagram showing an example of the functional configuration of a mobile phone.

FIG. 3 is a block diagram showing an example of the functional configuration of a mobile phone 1 of this example. The mobile phone 1 includes a GPS antenna 5, a GPS reception unit 10, a host processing unit 30, an operating unit 40, a display unit 50, a sound output unit 55, a mobile phone antenna 60, a mobile phone wireless communication circuit unit 70, a storage unit 80, and a timepiece unit 90.

The GPS antenna 5 is an antenna which receives RF (Radio Frequency) signals including GPS satellite signals sent from GPS satellites, and outputs reception signals to the GPS reception unit 10.

The GPS reception unit 10 is a circuit or a device which calculates the position of the mobile phone 1 on the basis of the signal output from the GPS antenna 5, and corresponds to a so-called GPS receiver. In this embodiment, the GPS reception unit 10 corresponds to a satellite signal capturing device.

The GPS reception unit 10 includes an RF reception circuit unit 11 and a baseband processing circuit unit 20. The RF reception circuit unit 11 and the baseband processing circuit unit 20 may be manufactured as separate LSI (Large Scale Integration) or may be manufactured as one chip.

The RF reception circuit unit 11 is a reception circuit unit of RF signals. As a circuit configuration, for example, a reception circuit in which an RF signal output from the GPS antenna 5 is converted to a digital signal by an A/D converter, and the digital signal is processed may be provided. A configuration in which signal processing is performed on an RF signal output from the GPS antenna 5 as an analog signal, and after A/D conversion, a digital signal is finally output to the baseband processing circuit unit 20 may be provided.

In the latter case, for example, the RF reception circuit unit 11 may be configured as follows. That is, a predetermined oscillation signal is divided or multiplied to generate an oscillation signal for RF signal multiplication. The generated oscillation signal is multiplied to the RF signal output from the GPS antenna 5 to down-convert the RF signal to an intermediate-frequency signal (hereinafter, referred to as "IF (Intermediate Frequency) signal"), and the IF signal is amplified or the like, converted to a digital signal by the A/D converter, and output to the baseband processing circuit unit 20.

The baseband processing circuit unit 20 performs carrier removal, correlation value calculation, or the like on the reception signal output from the RF reception circuit unit 11 to capture the GPS satellite signal. The position of the mobile phone 1 and timepiece errors are calculated using time information, satellite orbit information, or the like extracted from the captured GPS satellite signal.

The host processing unit 30 is a processor which performs overall control of the respective units of the mobile phone 1 in accordance with various programs, such as a system program stored in the storage unit 80, and has a processor, such as a CPU (Central Processing Unit). The host processing unit 30 causes the display unit 50 to display a map indicating the current position on the basis of the position coordinates acquired from the baseband processing circuit unit 20, or uses the position coordinates for various kinds of application processing.

The operating unit 40 is, for example, an input device having a touch panel, a button switch, or the like, and outputs a signal of a depressed key or button to the host processing unit 30. With the operation of the operating unit 40, the input of various instruction, such as a call request, a mail transmission/reception request, a request to execute various applications, and a position calculation request, is made.

The display unit 50 is a display device having an LCD (Liquid Crystal Display) or the like, and performs various kinds of display based on a display signal output from the host processing unit 30. A position display screen, time information, or the like is displayed on the display unit 50.

The sound output unit 55 is a sound output device having a speaker, and outputs various kinds of sound based on a sound output signal output from the host processing unit 30. Sound, such as voice during a call or sound guidance concerning various applications, is output from the sound output unit 55.

The mobile phone antenna 60 is an antenna which performs transmission/reception of a mobile phone radio signal with a wireless base station provided by a communication service provider of the mobile phone 1.

The mobile phone wireless communication circuit unit 70 is a communication circuit unit of the mobile phone which has an RF conversion circuit, a baseband processing circuit, and the like, and performs modulation and demodulation of the mobile phone radio signal, thereby realizing transmission/reception of a call or a mail, or the like.

The storage unit 80 has a storage device, such as a ROM (Read Only Memory), a flash ROM, or a RAM (Random Access Memory), and stores a system program used when the host processing unit 30 controls the mobile phone 1, or various programs or data for executing various kinds of application processing.

The timepiece unit 90 is an internal timepiece of the mobile phone 1, and has a crystal oscillator having a crystal vibrator and an oscillation circuit, or the like. The clocking time of the timepiece unit 90 is output to the baseband processing circuit unit 20 and the host processing unit 30 at any time. The clocking time of the timepiece unit 90 is corrected on the basis of timepiece errors calculated by the baseband processing circuit unit 20.

2-1-2. Circuit Configuration of Baseband Processing Circuit Unit

Figure 4:
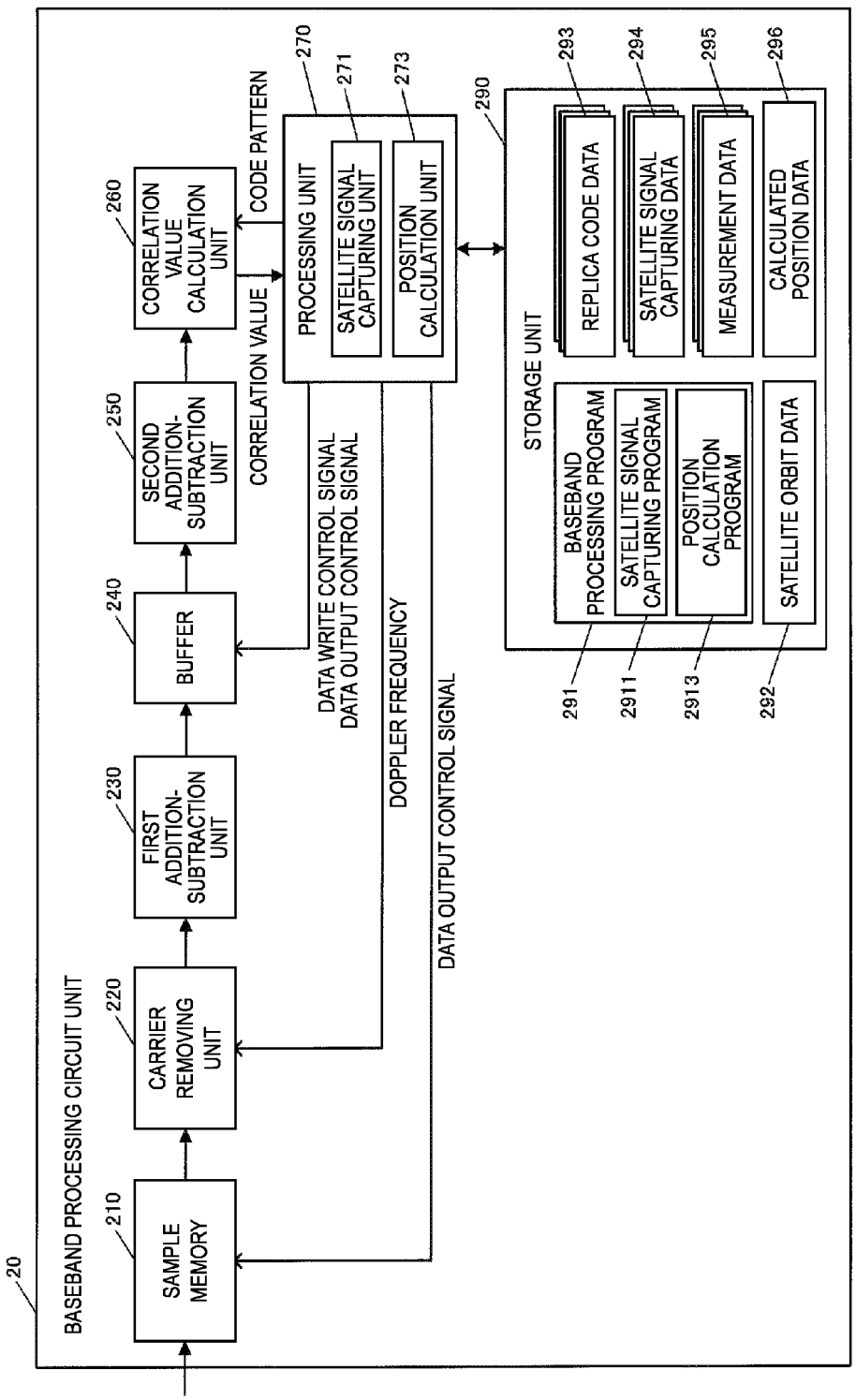
FIG. 4 is a block diagram showing an example of the circuit configuration of a baseband processing circuit unit.

FIG. 4 is a diagram showing an example of the circuit configuration of the baseband processing circuit unit 20 focusing on a circuit block involved in this example. The baseband processing circuit unit 20 includes, as a main part, a sample memory 210, a carrier removing unit 220, a first addition-subtraction unit 230, a buffer 240, a second addition-subtraction unit 250, a correlation value calculation unit 260, a processing unit 270, and a storage unit 290.

The sample memory 210 is a memory which stores the sampling values of the reception signals output from the RF reception circuit unit 11. The sample memory 210 selects a sampling value in response to an output control signal of data output from the processing unit 270, and outputs the sampling value to the carrier removing unit 220.

The carrier removing unit 220 multiplies a digitized carrier removing signal (the sampling value of the carrier removing signal) to the reception signal (the sampling value of the reception signal) output from the sample memory 210, thereby detecting the reception signal.

Specifically, for each capturing-target satellite, the carrier removing signal with a frequency obtained by adding the Doppler frequency of the GPS satellite signal received from the capturing-target satellite to a frequency when a carrier frequency is down-converted to an IF frequency is generated. The generated carrier removing signal is multiplied to the reception signal. Accordingly, the detection of the reception signal is performed, and data of the reception signal with the carrier removed is output to the first addition-subtraction unit 230.

The first addition-subtraction unit 230 has, for example, a logic circuit, and performs first addition-subtraction on the sampling value of the reception signal output from the carrier removing unit 220 while changing the combinations of addition and subtraction. The computation results of the first addition-subtraction unit 230 are output to the buffer 240.

The buffer 240 is a storage unit (first storage unit) which temporarily stores the computation results of the first addition-subtraction unit 230. The buffer 240 writes the computation results of the first addition-subtraction unit 230 in response to a write control signal of data output from the processing unit 270. The buffer 240 also selects written data and outputs written data to the second addition-subtraction unit 250 in response to an output control signal of data output from the processing unit 270.

The second addition-subtraction unit 250 has, for example, a logic circuit, and performs second addition-subtraction for the first addition-subtraction results output from the buffer 240 while changing the combinations of addition and subtraction. The computation results of the second addition-subtraction unit 250 are output to the correlation value calculation unit 260.

The correlation value calculation unit 260 is a circuit unit which calculates the correlation values of the reception signals and the replica codes. The correlation value calculation unit 260 has a plurality of selection and totaling units.

The processing unit 270 is a control device and arithmetic device which performs overall control of the respective functional units of the baseband processing circuit unit 20, and has a processor, such as a CPU or a DSP (Digital Signal Processor). The processing unit 270 has, as a main functional unit, a satellite signal capturing unit 271 and a position calculation unit 273.

The satellite signal capturing unit 271 is a functional unit which captures GPS satellite signals. The satellite signal capturing unit 271 controls the correlation value calculation unit 260, selects the addition-subtraction result corresponding to time-series change in the code values of the replica codes from among the addition-subtraction results of the second addition-subtraction unit 250, and calculates the correlation values of the reception signals and the replica codes. The satellite signal capturing unit 271 captures the GPS satellite signals of the GPS satellites using the calculated correlation values.

The position calculation unit 273 performs predetermined position calculation processing using the GPS satellite signals captured by the satellite signal capturing unit 271 to calculate the position (position coordinates) of the mobile phone 1 and timepiece errors (clock bypass). For example, the position calculation processing can be realized as processing to which a least-square method, a Kalman filter, or the like is applied.

The storage unit 290 stores a system program of the baseband processing circuit unit 20, various programs for realizing various functions, such as a satellite signal capturing function and a position calculation function, data, and the like. The storage unit 290 has a work area which temporarily stores in-processing data, processing results, and the like of various kinds of processing.

2-1-3. Method of Calculating Correlation Value

Figure 5:
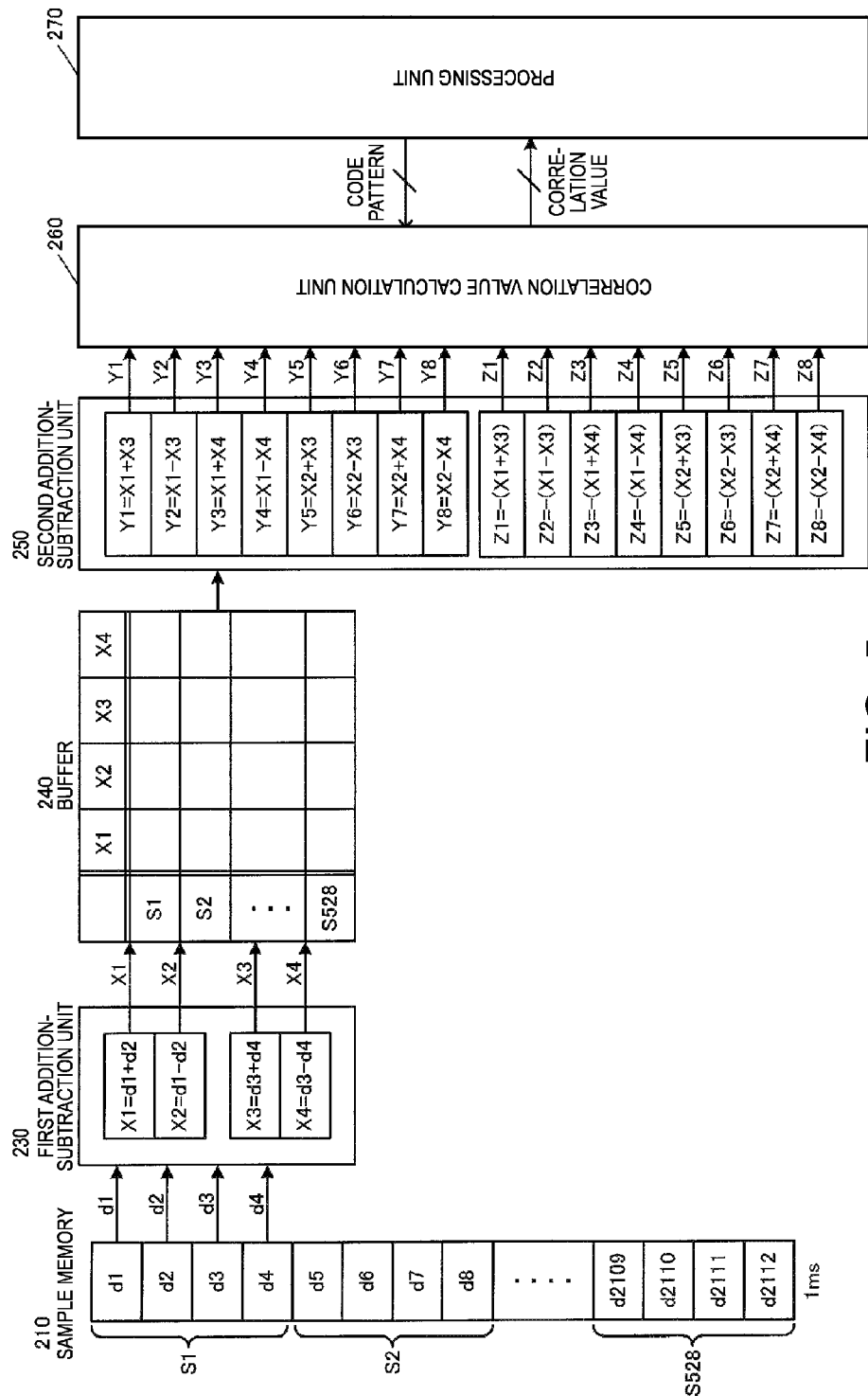
FIG. 5 is an explanatory view of a method of calculating a correlation value in a first example.

FIG. 5 is an explanatory view of a method of calculating a correlation value in the first example. In the first example, the correlation values are calculated assuming that k is equal to or greater than 4 ($k \geq 4$). As the simplest example, a case where "k=4" will be described. For clear description, in FIG. 5, the carrier removing unit 220 is not shown.

Initially, every four sampling values of the sampling values "d1" to "d2112" of the reception signals stored in the sample memory 210 are selected to generate the reception data sets "S1" to "S528". Next, for each of the reception data sets "S1" to "S528", the first addition-subtraction unit 230 performs addition-subtraction of four sampling values included in the reception data set while changing the combinations of addition and subtraction. At this time, the four sampling values are divided into two groups in two sampling values, and for each group, addition-subtraction of the two sampling values is performed while changing the combinations of addition and subtraction.

Description will be provided focusing on the reception data set "S1". The sampling values "d1" to "d4" included in the reception data set "S1" are divided into a first group of "d1" and "d2" and a second group of "d3" and "d4". For each of the first group and the second group, addition-subtraction of the two sampling values is performed while changing the combinations of addition and subtraction.

As the combination of positive and negative signs for addition-subtraction, four combinations of $\{(+,+), (+,-), (-,+), (-,-)\}$ are considered. However, since the $\{(+,+)$ and $(-,-)\}$, and $\{(+,-)$ and $(-,+)\}$ are combinations in which the positive and negative signs are inverted, the combinations with the inverted signs are omitted. Hereinafter, an example where addition-subtraction is performed with two combinations of $\{(+,+), (+,-)\}$ will be described.

If addition-subtraction is performed for the first group with the two combinations of the signs, "X1=d1+d2" and "X2=d1−d2" are obtained. If addition-subtraction is performed for the second group with the two combinations of the signs, "X3=d3+d4" and "X4=d3−d4" are obtained.

The above computation is performed for all of the reception data sets "S1" to "S528" to acquire first addition-subtraction results "X1" to "X4". The first addition-subtraction results concerning each reception data set are stored in the buffer 240. The buffer 240 stores the first addition-subtraction results "X1" to "X4" of each of the reception data sets "S1" to "S528".

Next, the second addition-subtraction unit 250 performs second addition-subtraction for the first addition-subtraction results stored in the buffer 240. That is, the second addition-subtraction is performed for the first addition-subtraction results of each of the reception data sets "S1" to "S528" while changing the combinations of addition and subtraction between the two groups of the first group and the second group.

Specifically, for each of the combination of "X1" and "X3", the combination of "X1" and "X4", the combination of "X2" and "X3", and the combination of "X2" and "X4", addition-subtraction is performed while changing the combinations of addition and subtraction. As a result, 16 addition-subtraction results shown in FIG. 5 are obtained.

That is, as a combination for addition-subtraction when "X1" and "X2" are positive, eight computation results of "Y1=X1+X3", "Y2=X1−X3", "Y3=X1+X4", "Y4=X1−X4", "Y5=X2+X3", "Y6=X2−X3", "Y7=X2+X4", and "Y8=X2−X4" are obtained.

As a combination for addition and subtraction when "X1" and "X2" are negative, eight computation results of "Z1=−(X1+X3)", "Z2=−(X1−X3)", "Z3=−(X1+X4)", "Z4=−(X1−X4)", "Z5=−(X2+X3)", "Z6=−(X2−X3)", "Z7=−(X2+X4)", and "Z8=−(X2−X4)" are obtained.

It is assumed that the 16 second addition-subtraction results obtained in this way are the addition-subtraction results of four (=k) sampling values. The 16 second addition-subtraction results are output to the correlation value calculation unit 260.

Figure 6:
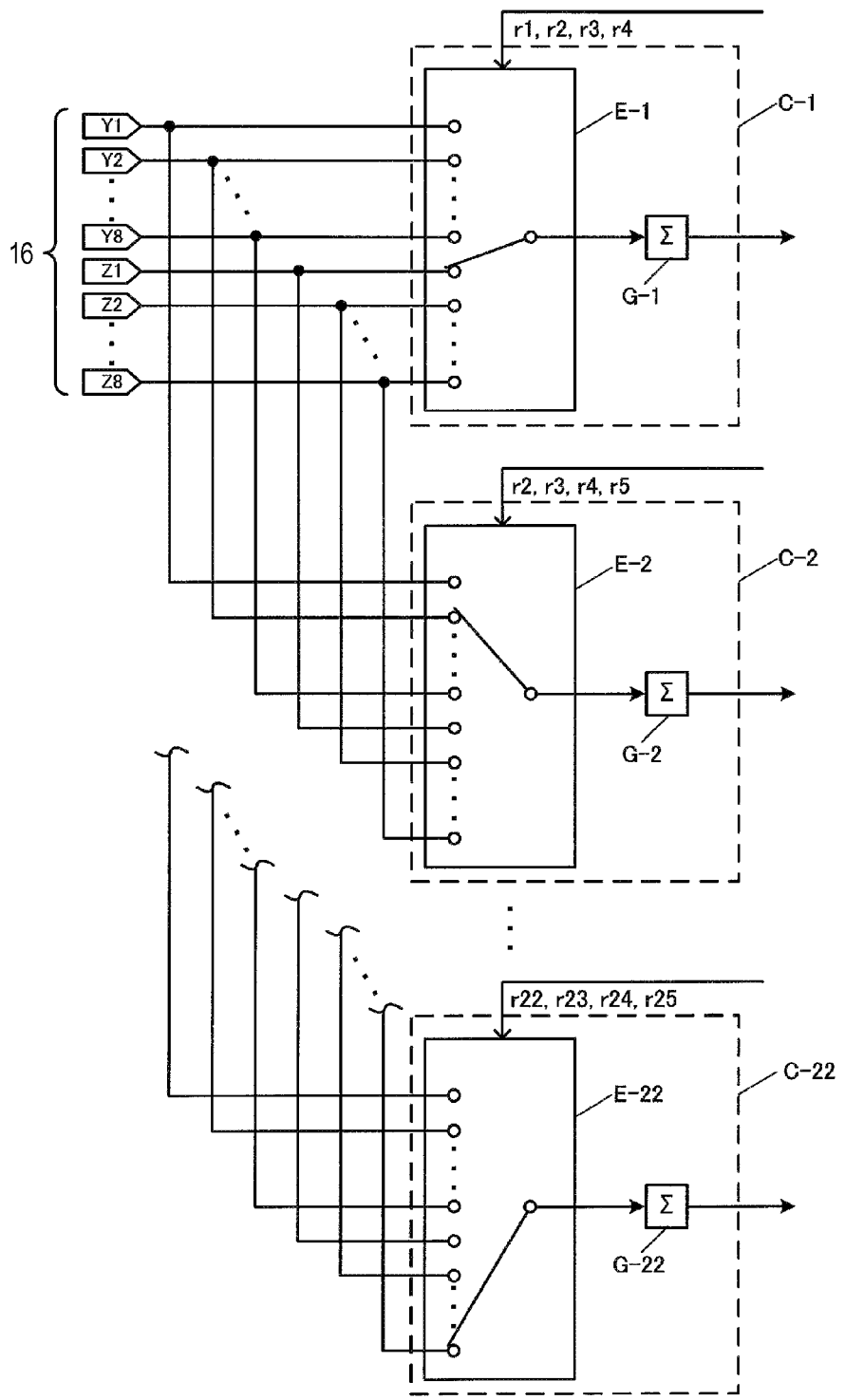
FIG. 6 is a diagram showing an example of the circuit configuration of a correlation value calculation unit in the first example.

FIG. 6 is a diagram showing an example of the circuit configuration of the correlation value calculation unit 260. The correlation value calculation unit 260 has a first selection and totaling unit C-1 to a 22nd selection and totaling unit C-22. The 16 second addition-subtraction results output from the second addition-subtraction unit 250 are input in parallel to the first selection unit E-1 to the 22nd selection unit E-22.

The code patterns are input from the processing unit 270 to the first selection unit E-1 to the 22nd selection unit E-22. Since "k=4", the code pattern input to each selection unit becomes a pattern which has a combination of four code values. The first selection unit E-1 to the 22nd selection unit E-22 select the addition-subtraction results (adder-subtractors) with the combinations of positive and negative signs of four code values included in the code patterns input from the processing unit 270, and output the addition-subtraction results to the first totaling unit G-1 to the 22nd totaling unit G-22.

The first totaling unit G-1 to the 22nd totaling unit G-22 total the product values concerning the reception data sets "S1" to "S528" output from the first selection unit E-1 to the 22nd selection unit E-22. The total value is output to the processing unit 270 as a correlation value.

2-1-4. Data Configuration

The storage unit 290 stores, as a program, a baseband processing program 291 which is read by the processing unit 270 and executed as baseband processing. The baseband processing program 291 includes, as a subroutine, a satellite signal capturing program 2911 which is executed as satellite signal capturing processing (see FIG. 8) and a position calculation program 2913 which is executed as position calculation processing. In regard to the position calculation processing, since the same processing as in the related art can be applied, description using a flowchart will not be provided.

The storage unit 290 stores, as main data, satellite orbit data 292, replica code data 293, satellite signal capturing data 294, measurement data 295, and calculated position data 296.

The satellite orbit data 292 is data, such as almanac or ephemeris of each GPS satellite. The satellite orbit data 292 is acquired by decoding the GPS satellite signals received from the GPS satellites, and acquired as assist data from the base station of the mobile phone 1 or an assist server.

The replica code data 293 is data in which the code value of a replica code simulating a C/A code is stored for each GPS satellite. Similarly to the sampling value of the reception signal, for example, data of 2112 sampled code values is stored.

Figure 7:
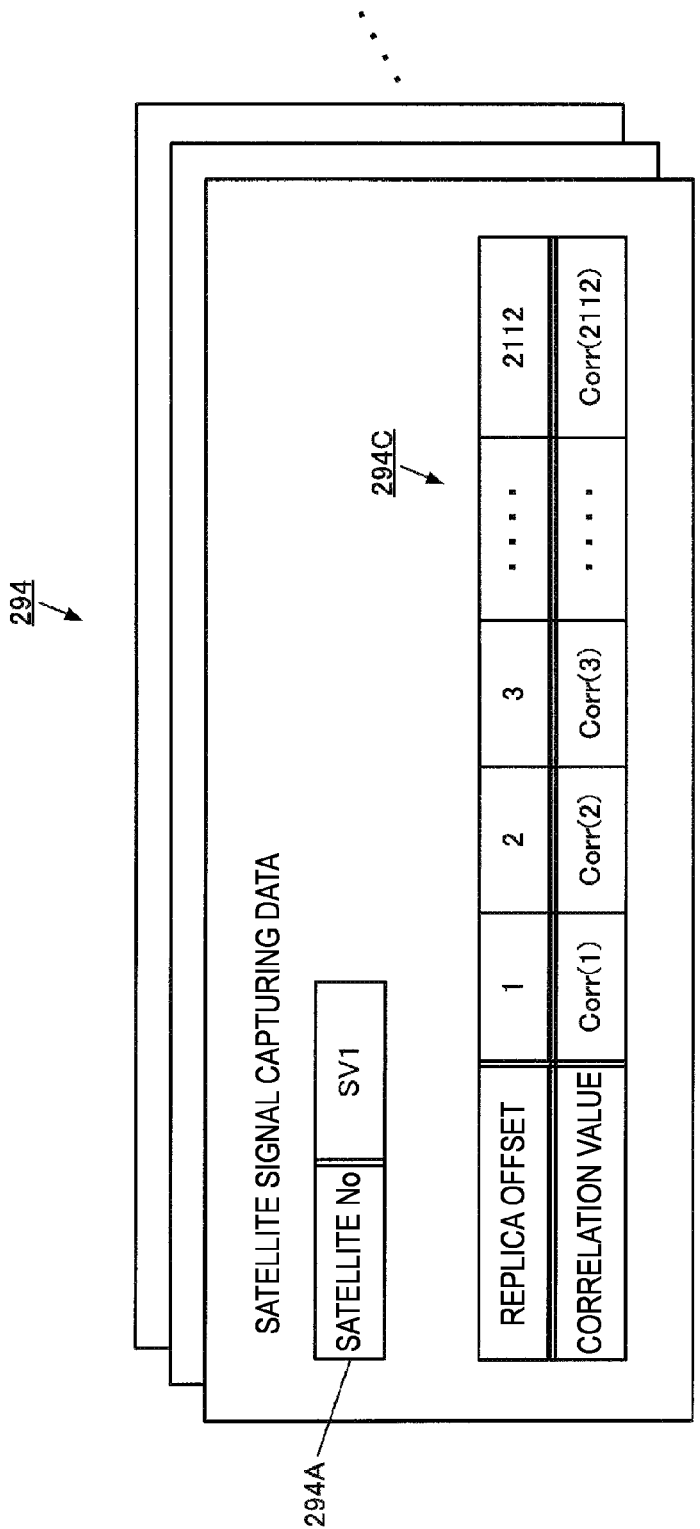
FIG. 7 is a data configuration diagram of satellite signal capturing data.

The satellite signal capturing data 294 is data which is used for capturing the satellite signal of each GPS satellite, and example of the data configuration is shown in FIG. 7. The satellite signal capturing data 294 stores a satellite No. 294A as the number of the GPS satellite and correlation value data 294C by replica offset.

The measurement data 295 is data in which measurement information regarding various kinds of amount, such as a code phase, a Doppler frequency, a pseudo distance, or a pseudo distance change rate concerning the captured GPS satellite signal, is stored by GPS satellite.

The calculated position data 296 is data of the calculation result acquired when the position calculation unit 273 performs position calculation processing, and includes the calculated position (position coordinates) of the mobile phone 1 or timepiece errors (clock bypass).

2-1-5. Flow of Processing

Figure 8:
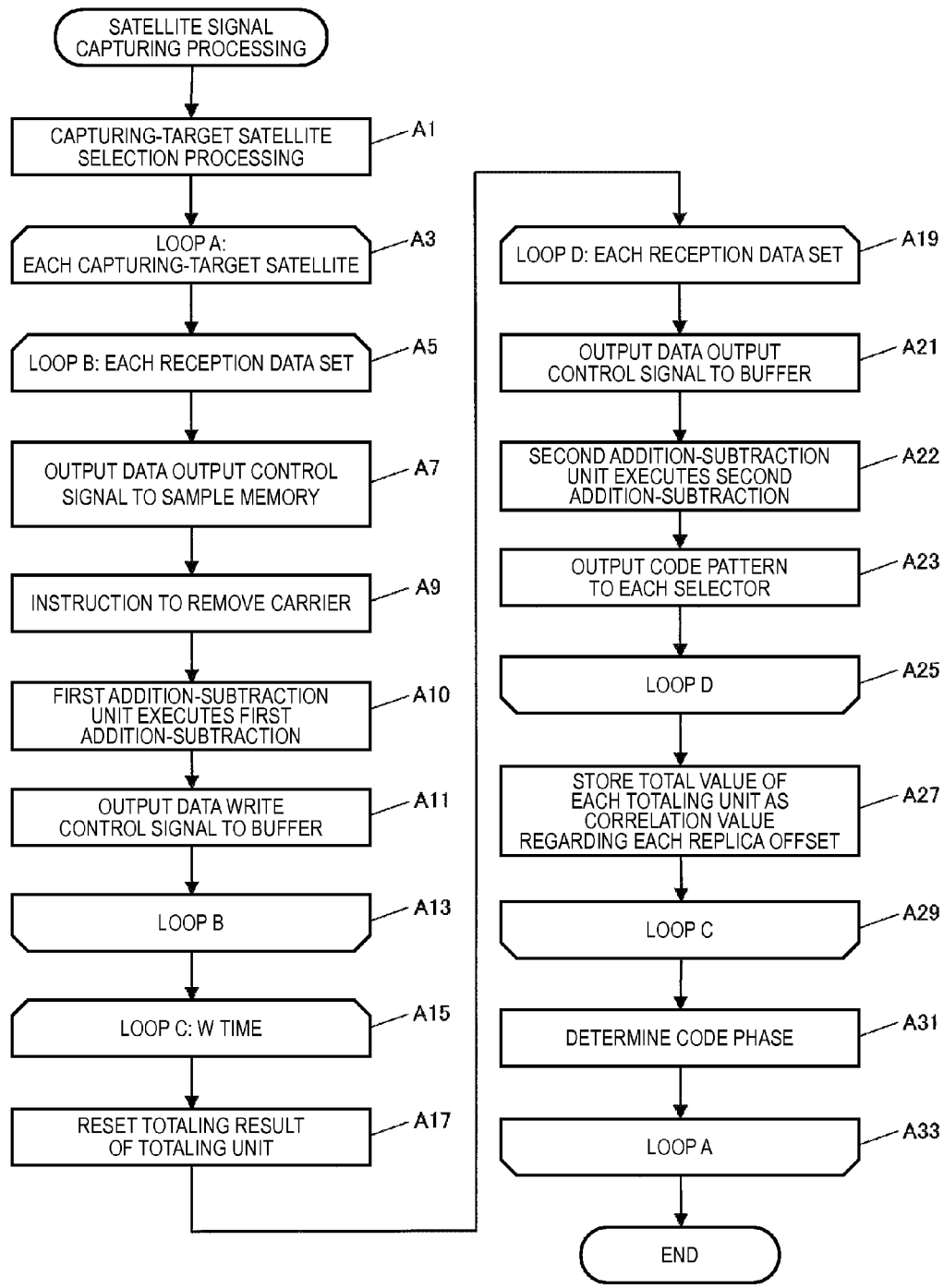
FIG. 8 is a flowchart showing a flow of satellite signal capturing processing.

FIG. 8 is a flowchart showing the flow of satellite signal capturing processing which is executed by the processing unit 270 in accordance with the satellite signal capturing program 2911 stored in the storage unit 290.

Initially, the satellite signal capturing unit 271 performs capturing-target satellite selection processing (Step A1). Specifically, a GPS satellite in the sky at a given reference position is determined using the satellite orbit data 292 of the storage unit 290 at the current time clocked by the timepiece unit 90, and selected as a capturing-target satellite. The reference position may be set by a method which sets a position acquired from the server by so-called server assist at the time of first position calculation after power activation and sets the latest calculation position at the time of second or subsequent position calculation.

Next, the satellite signal capturing unit 271 executes processing of a loop A for each capturing-target satellite selected in Step A1 (Steps A3 to A33). In the processing of the loop A, the satellite signal capturing unit 271 performs processing of a loop B for each reception data set (Steps A5 to A13).

In the processing of the loop B, the satellite signal capturing unit 271 outputs the output control signal of data to the sample memory 210 (Step A7). The output control signal is an instruction signal of a data read position. The sample memory 210 outputs the sampling values of the reception data set stored at the instructed read position to the carrier removing unit 220 in response to the output control signal from the satellite signal capturing unit 271.

Next, the satellite signal capturing unit 271 instructs the carrier removing unit 220 to remove carriers (Step A9). Specifically, the Doppler frequency concerning the capturing-target satellite is output to the carrier removing unit 220 to generate a carrier removing signal. The carrier removing unit 220 generates the carrier removing signal in accordance with an instruction from the satellite signal capturing unit 271, and multiplies the sampling values of the carrier removing signal to the sampling values output from the sample memory 210.

Next, the first addition-subtraction unit 230 performs the first addition-subtraction of k sampling values output from the carrier removing unit 220 while changing the combinations of addition and subtraction (Step A10).

Next, the satellite signal capturing unit 271 outputs the write control signal of data to the buffer 240 (Step A11). The write control signal is an instruction signal of a data write position. The buffer 240 writes the addition-subtraction results concerning the reception data set output from the first addition-subtraction unit 230 to the instructed write position in response to the write control signal from the satellite signal capturing unit 271. The satellite signal capturing unit 271 performs the processing of Steps A7 to A11 for all of the reception data sets (Step A13).

Thereafter, the satellite signal capturing unit 271 executes processing of a loop C W times so as to calculate the correlation values (Steps A15 to A29). In the processing of the loop C, the satellite signal capturing unit 271 resets the totaling result of the totaling unit G of the correlation value calculation unit 260 (Step A17).

Next, the satellite signal capturing unit 271 executes processing of a loop D for each reception data set (Steps A19 to A25). In the processing of the loop D, the satellite signal capturing unit 271 outputs the output control signal of data to the buffer 240 (Step A21). The buffer 240 outputs the first addition-subtraction results of the reception data set stored at the read position instructed by the output control signal to the second addition-subtraction unit 250.

Next, the second addition-subtraction unit 250 performs the second addition-subtraction for the first addition-subtraction results concerning the reception data set output from the buffer 240 while changing the combinations of addition and subtraction (Step A22).

Next, the satellite signal capturing unit 271 outputs the code pattern to each selection unit E of the first selection unit E-1 to the 22nd selection unit E-22 (Step A23). Each selection unit E selects the second addition-subtraction result output from the second addition-subtraction unit 250 in accordance with the code pattern input from the satellite signal capturing unit 271. The satellite signal capturing unit 271 progresses the processing to the next reception data set.

After the processing of Steps A21 to A23 is performed for all of the reception data sets, the satellite signal capturing unit 271 ends the processing of the loop D (Step A25). Thereafter, the satellite signal capturing unit 271 stores the total value of each totaling unit G in the correlation value data 294C of the satellite signal capturing data 294 as the correlation value concerning each replica offset (Step A27). The satellite signal capturing unit 271 progresses to the next processing.

After the processing of Steps A17 to A27 is performed W times, the satellite signal capturing unit 271 ends the processing of the loop C (Step A29). Thereafter, the satellite signal capturing unit 271 determines the code phase on the basis of the replica offset corresponding to the maximum correlation value from among a plurality of correlation values stored in the correlation value data 294C of the satellite signal capturing data 294, and stores the code phase in the measurement data 295 of the storage unit 290 (Step A31). The satellite signal capturing unit 271 processes the processing to the next capturing-target satellite.

After the processing of Steps A5 to A31 is performed for all of the capturing-target satellites, the satellite signal capturing unit 271 ends the processing of the loop A (Step A33). The satellite signal capturing unit 271 ends the satellite signal capturing processing.

2-1-6. Functional Effect

According to the first example, in the baseband processing circuit unit 20, addition-subtraction of the sampling values in a time series obtained by sampling the reception signals from the GPS satellites stored in the sample memory 210 is performed by a plurality of adder-subtractors with different combinations of addition and subtraction in the first addition-subtraction unit 230. The correlation values of the reception signals and the replica codes are calculated using the output value of one adder-subtractor for a combination of addition and subtraction corresponding to time-series change in the code values of the replica code, in the correlation value calculation unit 260.

Specifically, every four sampling values of the sampling values in a time series obtained by sampling the reception signals from the GPS satellites stored in the sample memory 210 are selected. Addition-subtraction of the selected four sampling values is performed in the first addition-subtraction unit 230 while changing the combinations of addition and subtraction. At this time, the first addition-subtraction is performed in each of the two groups of the four sampling values in two sampling values while changing the combinations of addition and subtraction of the sampling values. The computation results of the first addition-subtraction unit 230 are stored in the buffer 240. In the second addition-subtraction unit 250, the second addition-subtraction is performed for the first addition-subtraction results in each group stored in the buffer 240 while changing the combinations of addition and subtraction. The second addition-subtraction results are output to the correlation value calculation unit 260.

The correlation value calculation unit 260 has a plurality of selection and totaling units C each having the selection unit E and the totaling unit G. The selection unit E of each selection and totaling unit C selects the addition-subtraction result according to the code pattern having k code values of the replica codes input from the processing unit 270 from among the computation results of the second addition-subtraction unit 250. The totaling unit G of each selection and totaling unit C totals the output values (product values) from the selection unit E to calculate the correlation values.

Accordingly, the correlation values of the reception signals and the replica codes can be calculated without multiplying the sampling values of the reception signals and the code values of the replica codes. When multiplication is constituted by a circuit, a multiplier requires a larger number of circuit elements than a adder-subtractor. When multiplication is constituted by a program, the number of computation steps necessary for multiplication is enormously larger than the number of computation steps of addition-subtraction. For this reason, the effect that multiplication is not required is very large. Therefore, power consumption is of course reduced.

2-2. Second Example

A second example has a difference from the second addition-subtraction unit in the first example. Specifically, the second addition-subtraction unit is constituted by adder-subtractors in which some of 16 combinations of addition and subtraction are omitted.

Figure 9:
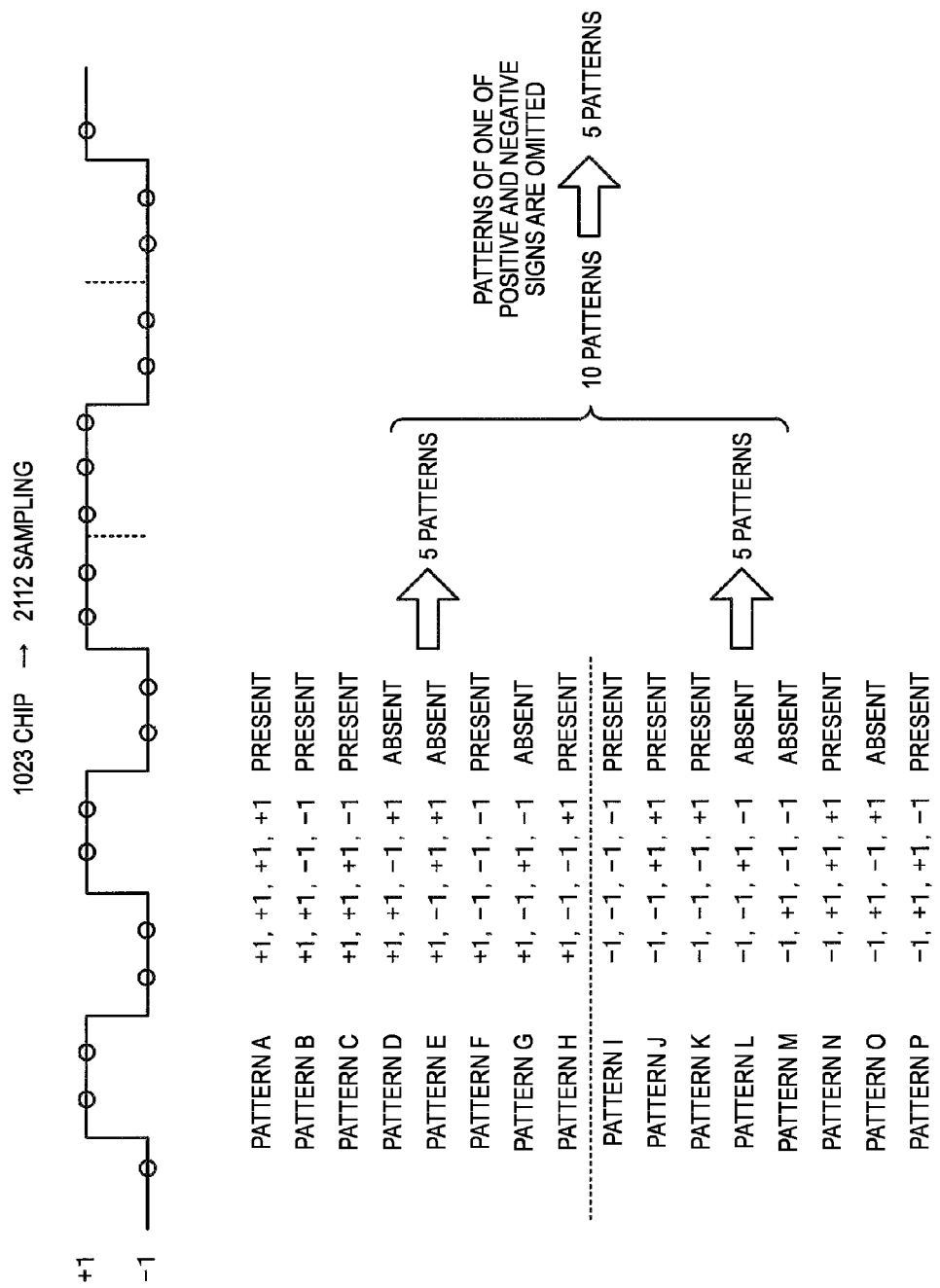
FIG. 9 is an explanatory view of the principle of a second example.

The principle that some of the combinations of addition and subtraction can be omitted will be described with reference to FIG. 9. If replica codes of 1023 chips are sampled 2112 times, two or three sampling values (code values) are included for one chip. If a code pattern of four continuous code values is considered, 16 patterns A to P shown on the lower side of FIG. 9 are considered. However, the patterns I to P are patterns in which the positive and negative signs of the patterns A to H are inverted. Accordingly, the patterns I to P can be omitted.

The number of codes included in one chip is not limited to one. That is, a code pattern in which one "+1" is sandwiched between "−1" or a code pattern in which one "−1" is sandwiched between "+1" cannot be generated. Accordingly, of the patterns A to H, the pattern D as the combination of {+1,+1,−1,+1}, the pattern E as the combination of {+1,−1,+1,+1}, and the pattern G as the combination of {+1,−1,+1,−1} cannot be generated. Similarly, the patterns L, M, and O in which the positive and negative signs of the patterns D, E, and G are inverted cannot be generated. Finally, the adder-subtractors corresponding to five combinations of addition-subtraction signs of the patterns A, B, C, F, and H are provided.

Instead of the adder-subtractors corresponding to five combinations of addition-subtraction signs of the patterns A, B, C, F, and H, the adder-subtractors corresponding to five combinations of addition-subtraction signs of the patterns I, J, K, N, and P as patterns with the inverted positive and negative signs may be of course provided.

2-2-1. Configuration of Second Addition-Subtraction Unit

Figure 10:
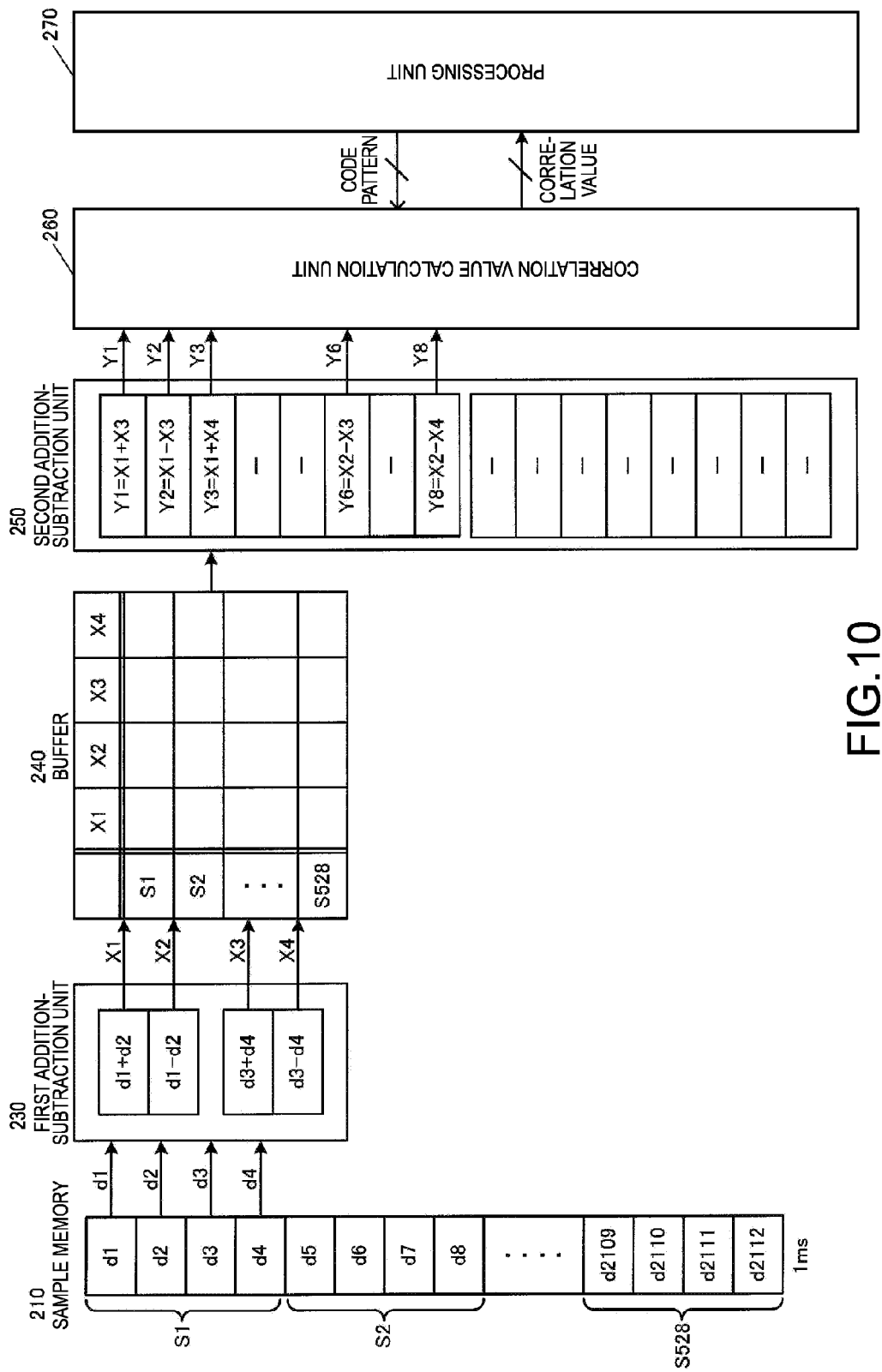
FIG. 10 is a diagram showing an example of the configuration of a second addition-subtraction unit in the second example.

FIG. 10 is a diagram showing a configuration example of the second addition-subtraction unit 250 in the second example. As described above, the adder-subtractors provided in the second addition-subtraction unit 250 are only the adder-subtractors corresponding to five combinations of positive and negative signs. For this reason, as shown in FIG. 10, the second addition-subtraction unit 250 has the adder-subtractors of Y1, Y2, Y3, Y6, and Y8 corresponding to the patterns A, B, C, F, and H. This corresponds to a circuit which sets the addition-subtraction sign of the head sampling value of four (=k) sampling values to be positive (+), and performs addition-subtraction of the remaining sampling value with different combinations of addition and subtraction.

2-2-2. Configuration of Correlation Value Calculation Unit

Figure 11:
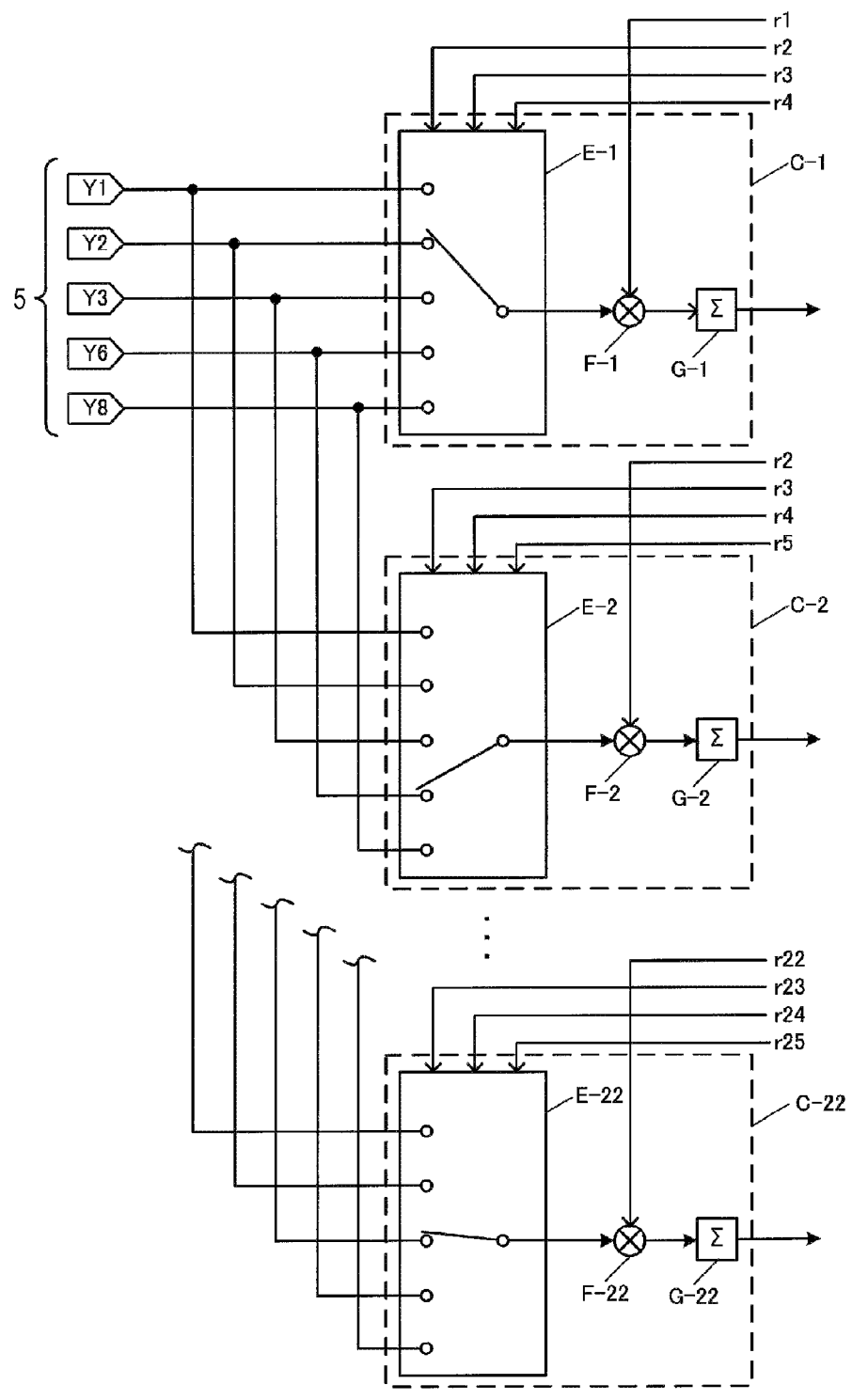
FIG. 11 is a diagram showing an example of the circuit configuration of a correlation value calculation unit in the second example.

FIG. 11 is a diagram showing a circuit configuration example of the correlation value calculation unit 260 in the second example. As in the first example, the correlation value calculation unit 260 has the first selection and totaling unit C-1 to the 22nd selection and totaling unit C-22. A difference from the first example is that, in each selection and totaling unit C, a multiplication unit F is provided between the selection unit E and the totaling unit G.

Five addition-subtraction results of "Y1", "Y2", "Y3", "Y6", and "Y8" are input in parallel to the selection units E from the second addition-subtraction unit 250. A combination of three code values excluding the head code value in a code pattern having four code values is input from the processing unit 270 to each selection unit E.

For example, in a case where the reception data set "S1" will be processed, a combination of {r2,r3,r4} is input to the first selection unit E-1, a combination of {r3,r4,r5} is input to the second selection unit E-2, . . . , and a combination of {r23,r24,r25} is input to the 22nd selection unit E-22.

Similarly, for example, in a case where the reception data set "S2" will be processed, a combination of {r6,r7,r8} is input to the first selection unit E-1, a combination of {r7,r8, r9} is input to the second selection unit E-2, . . . , and a combination of {r27,r28,r29} is input to the 22nd selection unit E-22.

Each selection unit E selects the addition-subtraction result (adder-subtractor) input from the second addition-subtraction unit 250 in accordance with a combination of three code values input from the processing unit 270. "Y1", "Y2", "Y3", "Y6", and "Y8" are the computation results when the addition-subtraction sign of the head sampling value from among four sampling values is assumed as positive (+). Accordingly, the addition-subtraction result in which a combination of addition-subtraction signs of three sampling values excluding the head sampling value coincides with a combination of signs of the three code values input from the processing unit 270 is selected.

The output result from each selection unit E is output to the multiplication unit F, and is multiplied to the head code value in the code pattern having the four code values. For example, in the first multiplication unit F-1, the output value from the first selection unit E-1 and the code value "r1" are multiplied, and the multiplication result is output to the first totaling unit G-1. If the head code value is "+1", the output value from the selection unit E is output to the totaling unit G directly. If the head code value is "−1", the output value from the selection unit E is changed in the sign on the basis of the code value and then output to the totaling unit G.

Although in the above description, an example where the configuration of the second addition-subtraction unit 250 and the correlation value calculation unit 260 when five combinations of addition and subtraction from among 16 combinations of addition and subtraction are performed has been described, for example, a configuration in which eight combinations of addition and subtraction of the patterns A to H or the patterns I to P of FIG. 9 are performed may be provided.

Figure 12:
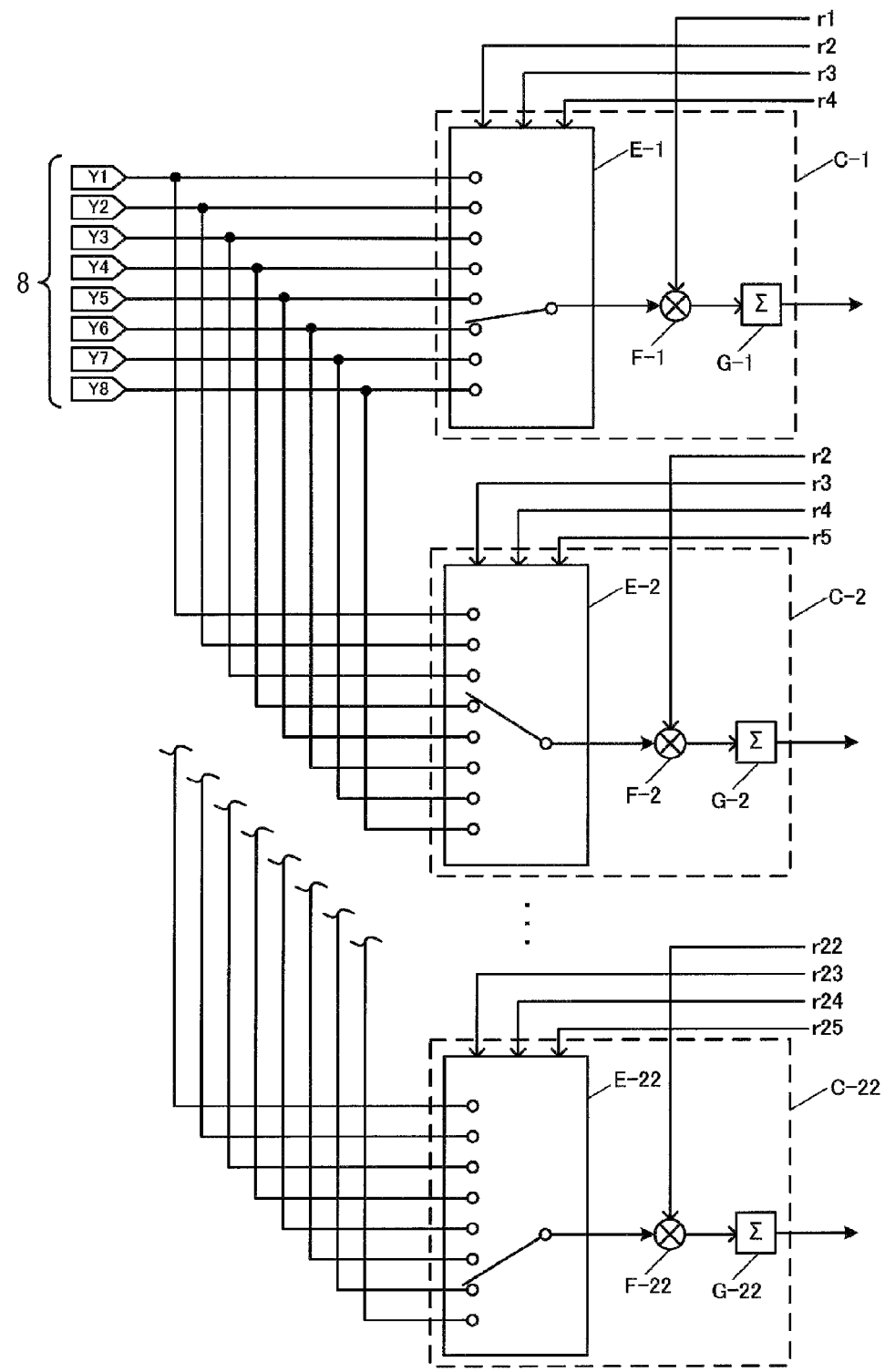
FIG. 12 is a diagram showing an example of the configuration of a second addition-subtraction unit in a modification.

FIG. 12 is a circuit configuration diagram of the correlation value calculation unit 260 in this case. A difference from the circuit configuration diagram of FIG. 11 is that, instead of five computation results of "Y1", "Y2", "Y3", "Y6", and "Y8" from the second addition-subtraction unit 250, eight computation results of "Y1" to "Y8" are input.

The configuration of FIG. 11 or 12 corresponds to a configuration in which, in the correlation value calculation unit, the selection unit selects one adder-subtractor on the basis of a combination of code values other than one code value corresponding to one sampling value from among k code values. The multiplication unit corresponds to a configuration in which the totaling unit calculates the correlation value using a value when the sign of the output value of one adder-subtractor selected by the selection unit is changed on the basis of one code value.

In FIG. 11 or 12, since "one sampling value" is the head sampling value of the reception data set, "one code value" is the head code value of the replica data set. However, this is just an example, and for example, a configuration in which "one sampling value" is the last sampling value of the reception data set, and "one code value" is the last code value of the replica data set may be provided. In this case, while the combination of addition and subtraction to be omitted is different, consequently, the fact remains that the same combination as the configuration of FIG. 11 or 12 is provided.

2-2-3. Functional Effect

According to the second example, in the second addition-subtraction unit 250, a plurality of adder-subtractors are constituted by circuits which perform addition-subtraction with different combinations of addition and subtraction when the addition-subtraction sign of the head (one) sampling value from among four (=k) sampling values is assumed as positive (predetermined sign). A plurality of adder-subtractors are constituted by circuits which perform addition-subtraction of a combination of addition-subtraction signs corresponding to possible time-series change in the code values when the replica codes are sampled to 2112 pieces. With this configuration, it is not necessary to prepare circuits for the combinations of addition and subtraction of all the four sampling values, thereby simplifying the circuit configuration. This leads to reduction in power consumption.

3. Modifications

The examples to which the invention can be applied are not limited to the foregoing examples, and may be of course appropriately changed without departing from the scope of the invention. Hereinafter, modifications will be described.

3-1. Value of k

In the above description of the principle, an example where every two sampling values of the sampling values of the reception signals are selected to generate the reception data sets has been described. In the foregoing examples, an example where every four sampling values of the sampling values of the reception signals are selected to generate the reception data sets has been described. However, the value of k when every k sampling values of the sampling values of the reception signals are selected is not limited to these values, and may be of course appropriately selected.

When k is equal to or greater than 4, and addition-subtraction is performed for two groups in k sampling values, computation may be performed with the same number of sampling values between the first group and the second group, or computation may be performed with different numbers of sampling values between the first group and the second group. For example, when "k=5", the number of sampling values included in the first group may be "2", and the number of sampling values included in the second group may be "3".

3-2. Totaling of Reception Signals

Although in the foregoing embodiment, a case where addition-subtraction is performed on the sampling values for 1 millisecond stored in the sample memory has been described, the sampling values for 1 millisecond or more may be stored in the sample memory.

For example, the sampling values of the reception signals for 10 milliseconds are stored in the sample memory. Since data for 1 millisecond is sampled to 2112 pieces, 2112×10 sampling values are accumulated and stored in the sample memory. 1 millisecond corresponds to one C/A code period. Accordingly, the sampling values with the same phase (sample timing) are totaled.

That is, from among the sampling values for 1 millisecond ten times of the first 1 millisecond, the next 1 millisecond, and the subsequent 1 millisecond, 10 sampling values at the same sample timing are totaled. As a result, the total values become 2112 values with the phase (sample timing) changed. The total value is used as the sampling values of the foregoing embodiment. This method is effective in the weak electric field environment so as to improve sensitivity.

3-3. Second Addition-Subtraction

In the second example, a case where ten combinations of addition and subtraction from among 16 combinations of addition and subtraction are omitted, and five combinations of addition and subtraction are performed has been described. However, adder-subtractors which perform addition-subtraction with a combination of addition-subtraction signs concerning code patterns with the inverted positive and negative signs are not omitted, and the second addition-subtraction unit may perform ten combinations of addition and subtraction.

That is, a circuit configuration may be provided in which the second addition-subtraction unit has adder-subtractors which perform ten combinations of addition and subtraction in total of five combinations of "Y1", "Y2", "Y3", "Y6", and "Y8" and five combinations of "Z1", "Z2", "Z3", "Z6", and "Z8", and the ten addition-subtraction results are input to the correlation value calculation unit.

3-4. Selection and Totaling Unit

Although in the foregoing embodiment, a case where the number of selection and totaling units provided in the correlation value calculation unit is 22 has been described, of course, the value which can be selected as the number of selection and totaling units is not limited to this value. In the foregoing embodiment, since the reception signals for 1 millisecond are sampled 2112 times, the number which is obtained when the number of times of sampling is divided by an integer may be selected as the number of selection and totaling units. For example, 44 (=2112÷48), 88 (=2112÷24), or the like may be used.

3-5. Presence/Absence of Buffer

Although in the foregoing examples, the computation results of the first addition-subtraction unit 230 may be stored in the buffer 240, the buffer 240 may not be provided. That is, the computation of the first addition-subtraction unit 230 may be performed each time correlation processing is performed.

3-6. Presence/Absence of Output Control Signal and Write Control Signal of Data

Although in the foregoing examples, the output control signal of data is output to the sample memory 210, and the write control signal and the output control signal of data are output to the buffer 240, the output control signal and the write control signal of data may not be provided.

3-7. Electronic Apparatus

Although in the foregoing examples, a case where the invention is applied to a mobile phone as a type of electronic apparatus has been described, an electronic apparatus to which the invention can be applied is not limited thereto. For example, the invention may be applied to other electronic apparatuses, such as a car navigation device, a portable navigation device, a personal computer, a PDA (Personal Digital Assistant), and a wristwatch.

3-8. Position Calculation System

Although in the foregoing embodiment, an example where the GPS is used as a position calculation system has been described, a position calculation system using a different satellite positioning system, such as WAAS (Wide Area Augmentation System), QZSS (Quasi Zenith Satellite System), GLONASS (GLObal NAvigation Satellite System), or GALILEO, may be applied.

What is claimed is:

1. A method of acquiring a satellite signal, comprising:
   calculating a correlation result of a reception signal from a satellite and a replica code using a first output value of a first adder-subtractor and a second output value of a second adder-subtractor, the first adder-subtractor being an adder-subtractor for a combination of addition and subtraction corresponding to time-series change in code values of the replica code among a first set of adder-subtractors for addition-subtraction of a first portion of sampling values obtained by sampling the reception signal in a time series with different combinations of addition and subtraction, and the second adder-subtractor being an adder-subtractor for a combination of addition and subtraction corresponding to time-series change in code values of the replica code among a second set of adder-subtractors for addition-subtraction of a second portion of the sampling values with different combinations of addition and subtraction, and
   acquiring the satellite signal of the satellite using the correlation result.

2. The method according to claim 1,
   wherein the first set of adder-subtractors include circuits which perform addition-subtraction with different combinations of addition and subtraction when the addition-subtraction sign of one sampling value of k (k≥2) sampling values is assumed as a predetermined sign, wherein k is an integer, and
   the calculating of the correlation result includes
      selecting the first adder-subtractor based on a combination of code values other than one code value corresponding to the one sampling value from among k code values, and
      changing a sign of the output value of the first adder-subtractor based on the one code value.

3. A device for acquiring a satellite signal, the device comprising:
   a first set of adder-subtractors which add and subtract a first portion of sampling values, the sampling values being obtained by sampling a reception signal from a satellite in a time series with different combinations of addition and subtraction;
   a second set of adder-subtractors which add and subtract a second portion of the sampling values with different combinations of addition and subtraction;
   a correlation value calculation unit which calculates a correlation result of the reception signal and a replica code using a first output value of a first adder-subtractor and a second output value of second adder-subtractor, the first adder-subtractor being an adder-subtractor for a combination of addition and subtraction corresponding to time-series change in code values of the replica code from among the first set of adder-subtractors, and the second adder-subtractor being an adder-subtractor for a combination of addition and subtraction corresponding to time-series change in code values of the replica code among the second set of adder-subtractors; and an acquiring unit which acquires the satellite signal of the satellite using the correlation result.

4. The device according to claim 3, wherein the first set of adder-subtractors include circuits which perform addition-subtraction with different combinations of addition and subtraction when the addition-subtraction sign of one sampling value of k (k≥2) sampling values is assumed as a predetermined sign, wherein k is an integer, and the correlation value calculation unit selects the first adder-subtractor based on a combination of code values other than one code value corresponding to the one sampling value from among k code values, and calculates the correlation result using a value obtained by changing a sign of the output value of the first adder-subtractor based on the one code value.

5. The device according to claim 4, wherein k is equal to or greater than 4, and the first portion of the sampling values and the second portion of the sampling values are obtained by grouping the k sampling values into two groups, the device further comprises:

a storage unit which stores the addition-subtraction results of the first and second sets of adder-subtractors; and a plurality of addition-subtraction units which add and subtract the results stored in the storage unit by changing the combinations of addition and subtraction between the results of the first set of adder-subtractors and the second set of adder-subtractors.

6. The device according to claim 3, wherein the reception signal includes a signal BPSK (Binary Phase Shift Keying) modulated at N [Hz], the sampling frequency is M (>2N) [Hz], and the plurality of addition-subtraction units include circuits which perform addition-subtraction of a combination of addition-subtraction signs corresponding to possible time-series change in code values when sampling the replica code at M [Hz].

* * * * *